United States Patent [19]

Watanabe

[11] Patent Number: 5,598,247
[45] Date of Patent: Jan. 28, 1997

[54] AUTOMATIC FOCUS ADJUSTMENT DEVICE

[75] Inventor: Toshimi Watanabe, Kanagawa-ken, Japan

[73] Assignee: Nikon Corporation, Tokyo, Japan

[21] Appl. No.: 515,063

[22] Filed: Aug. 14, 1995

[30] Foreign Application Priority Data

Sep. 7, 1994 [JP] Japan .................... 6-214080

[51] Int. Cl.⁶ .................... G03B 13/36
[52] U.S. Cl. .................... 396/95; 396/133
[58] Field of Search .................... 354/400, 402, 354/406, 407, 408

[56] References Cited

U.S. PATENT DOCUMENTS 5,504,551  4/1996  Kusaka et al. .................... 354/402

*Primary Examiner*—W. B. Perkey
*Attorney, Agent, or Firm*—Oliff & Berridge

[57] ABSTRACT

An automatic focus adjustment device and method for a high-speed continuous photography camera are disclosed. The device and method make possible lens driving based on the focus detection results of a previous exposure cycle, even if the current focus detection calculations between frames have not been completed.

20 Claims, 15 Drawing Sheets

AUTOMATIC FOCUS ADJUSTMENT DEVICE

BACKGROUND OF THE INVENTION

1. Field of the Invention

The present invention relates to an automatic focus adjustment device for a photographic camera, video camera, or the like.

2. Description of Related Art

The related art technology is described hereafter, with reference to FIG. 1. FIG. 1 shows the continuous photography sequence of a camera with which continuous photography is possible. An autofocus (AF) accumulation calculation, the states of and object positions (solid line 20) for an AF motor, SQ motor, and feeding motor, and the lens positions (dash line 21) are shown. □(an empty box) shows the AF accumulation. Shorter elongated darkened boxes 22 indicate exposures and a longer elongated darkened box (not numbered) shows the AF calculation. The CCD accumulation begins after a specified time interval has elapsed after the mirror down operation. After the CCD accumulation is finished, the focus detection calculation is accomplished. The AF motor is used to drive the lens, and has a driving state and a stopped state. The SQ motor is a motor that controls the mirror up operation, diaphragm regulation, the mirror down operation, and shutter operation of the camera. When this motor rotates in the forward direction, the mirror up and diaphragm closing operations are accomplished; in the reverse rotation direction, the mirror down, diaphragm reset, and shutter operations are accomplished. The feeding motor is a motor that accomplishes film feeding. For continuous photography second frame lens driving of a conventional camera, lens driving is permitted and is accomplished based on the focus detection calculation when the focus detection calculation is finished after mirror down and when either the SQ motor or the feeding motor is stopped.

With a camera that accomplishes high-speed continuous photography, when continuous photography is accomplished for a moving object, the time interval for the mirror up operation is approximately the time interval during which lens driving is possible. The mirror up time interval is generally 50 ms to 100 ms, and becomes shorter if the frame speed during continuous photography is increased. Therefore, the exposures (shown by short darkened boxes 22 in FIG. 1) are accomplished before the lens driving that must occur between frames has been completed, and an out-of-focus picture is taken. In the case of a system in which exposure is accomplished after waiting for the lens driving to finish, the frame speed must necessarily be decreased.

SUMMARY OF THE INVENTION

In order to resolve the problems stated above and other problems, a camera with which continuous photography is possible is equipped with a focus detection circuit that repeatedly detects the focus adjustment state of the phototaking lens; a memory circuit that stores the focus detection results of the focus detection device; and a pre-driving circuit that accomplishes driving of the lens based on the previous focus detection results that are stored in the memory before the focus detection results are calculated by the lens driving circuit that drives the phototaking lens based on the focus detection results of the focus detection circuit obtained by the focus detection circuit in the time between frames of continuous photography.

When the lens driving motor can be driven before the focus detection results between frames are output, the lens driving is accomplished based on the focus detection results before a previous exposure, that is, during a previous cycle of exposures. In other words, when either the SQ motor or the feeding motor is stopped, since the AF motor can be driven, even if the focus detection calculation between frames has not been completed at this point, since lens driving is possible based on the focus detection results of a previous cycle, the lens driving is carried out based on those results. Driving the lens based on previous results before the calculation results of focus detection between frames have been output is hereafter called "pre-driving." Namely, when lens driving becomes possible before the focus detection results between frames are output, the lens driving is commenced based on the focus detection results up through the previous cycle.

Furthermore, a preventing circuit is provided which prevents pre-driving according to the object state.

Rapid successive photography can be accomplished even in the case of a fast-moving object, and a focused picture can be taken.

DETAILED DESCRIPTION OF PREFERRED EMBODIMENTS

Preferred embodiments according to the present invention will be described in the following with reference to the accompanying drawings.

Figure 3:
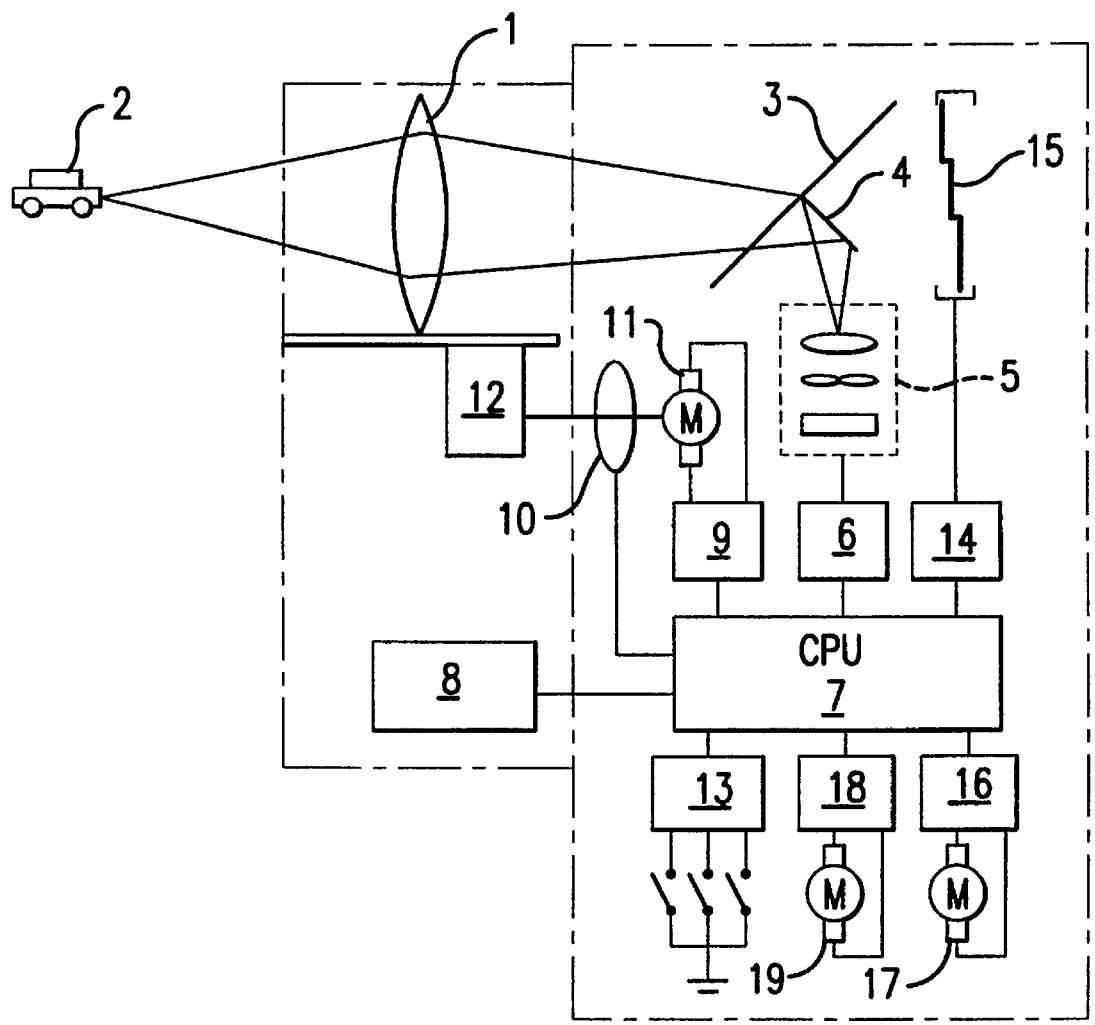
FIG. 3 is a structural diagram of a camera of the first and second embodiments of the present invention.

FIG. 3 is a structural diagram of a camera of the present invention. A portion of the light from the object 2 transmitted by the phototaking lens 1 is guided to an autofocus (AF) module 5 by a main mirror 3 and a sub-mirror 4 and converted to an electrical signal corresponding to the focus adjustment state of the phototaking lens 1 at the AF module 5. The AF module 5 is a known focus detection device that is structured from a re-imaging optical system and a sensor, and is controlled by a sensor driving circuit 6. The electrical signal corresponding to the focus adjustment state undergoes A/D conversion in the CPU 7 and is stored in a memory within the CPU 7. A lens information storing circuit 8 stores information that is peculiar to the lens such as the focal length of the phototaking lens 1, defocus amount/lens driving amount conversion coefficients, and the like. The lens driving amount is calculated based on data stored in the CPU 7 and on the defocus amount/lens driving amount conversion coefficients stored in the lens information memory circuit 8. Based on this lens driving amount, the CPU 7 controls the driving of the motor 11 while monitoring a motor controlling circuit 9 and the lens driving amount or the lens position through an encoder 10. The driving force from an AF motor 11 is transmitted to a lens moving mechanism 12 and accomplishes focus adjustment. An operating component 13 includes a plurality of switches. A switch SW1 (referred to hereafter as a "half-press switch"), which turns "on" with the first stroke of a half-press button, a switch SW2 (referred to hereafter as a "full-press switch"), which turns "on" with the second stroke, and the like are included in the operating component 13. The CPU 7 begins lens movement when the half-press switch turns on. When the full-press switch turns on, the CPU 7 controls the SQ motor 17 via the SQ motor controlling component 16, raises the main mirror 3 and the sub-mirror 4, and controls the shutter 15 via a shutter controlling component 14 and commences exposure after the mirror up operation has been completed. After exposure has been completed, the SQ motor 17 is rotated in the reverse direction, the main mirror 3 and the sub-mirror 4 are lowered to a specified position, and the shutter is simultaneously charged for the next exposure. In addition, a feeding motor 19 is caused to rotate via a feeding motor controlling component in order to feed the film.

Figure 1:
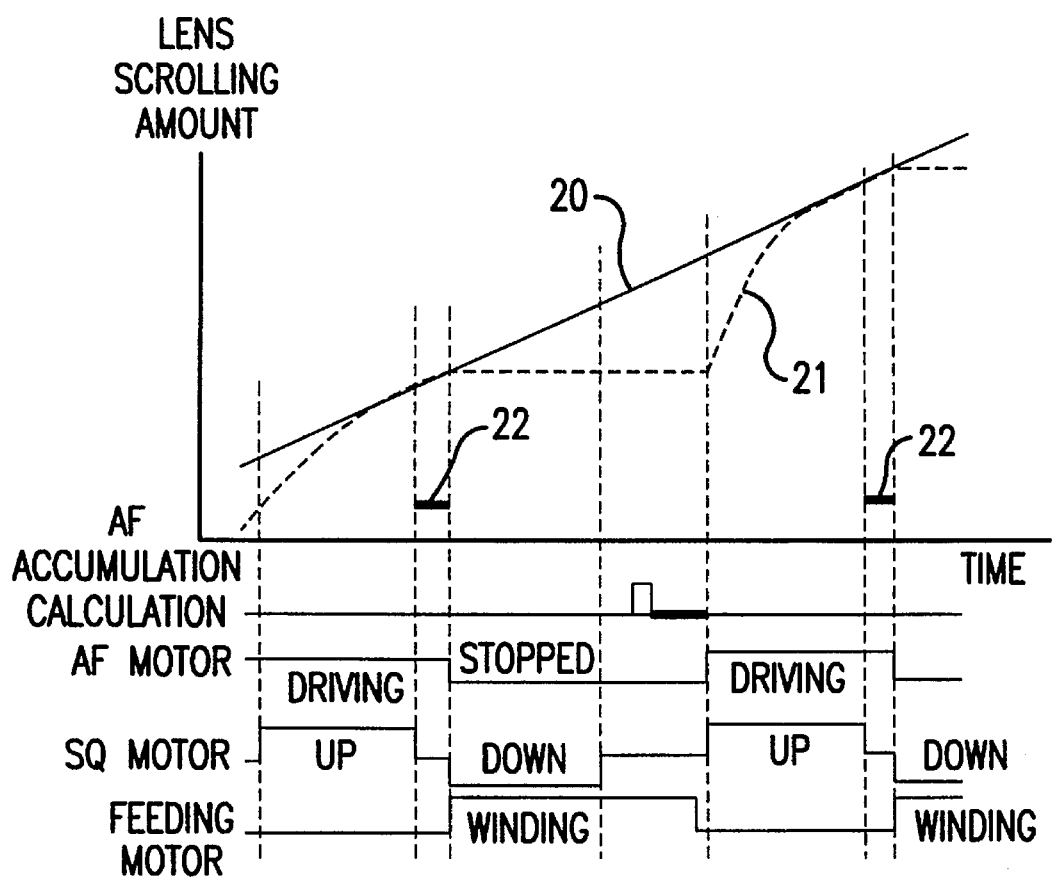
FIG. 1 is a graph of lens scrolling amounts versus time with actuation time according to related art technology.
Figure 2:
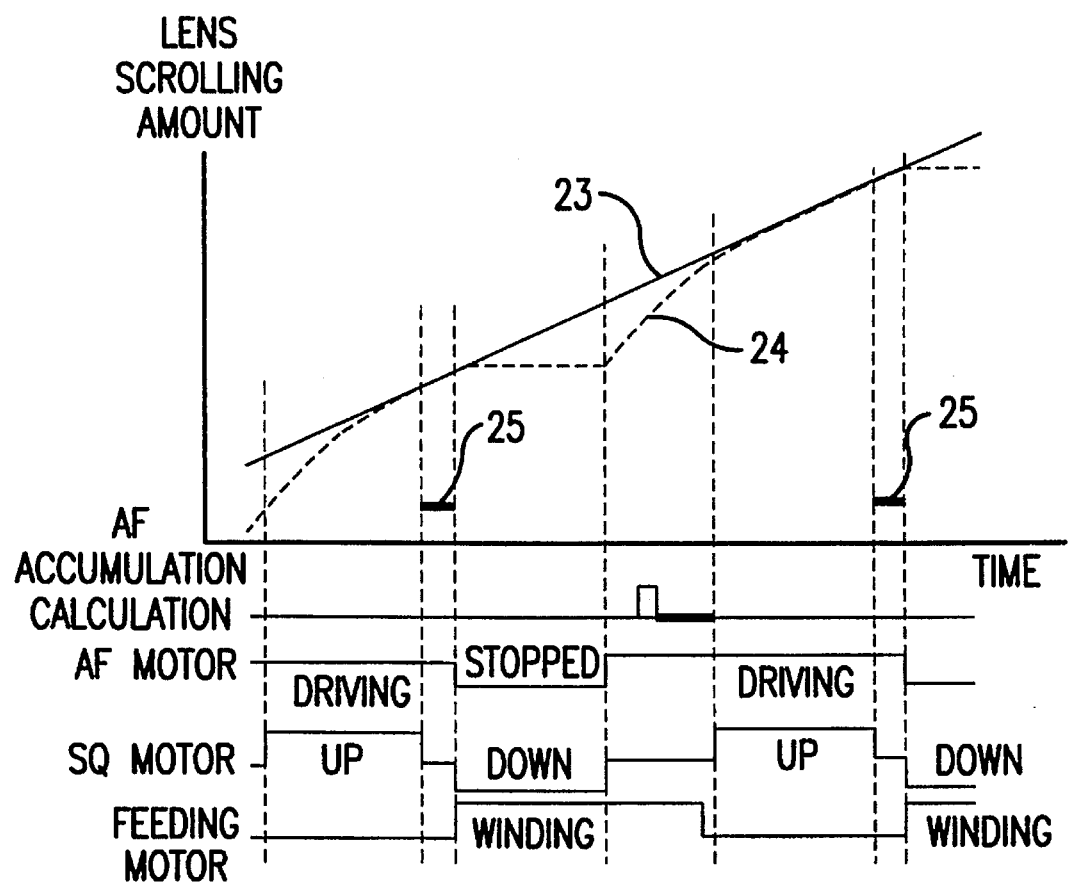
FIG. 2 is a graph of lens scrolling amounts versus time according to a first embodiment of the present invention.

These operations are initiated by software routines within the CPU 7. FIG. 2 is a graph of lens scrolling amount versus time that shows the states of an object positions (solid line 23) for an AF motor, SQ motor, and feeding motor, and the lens positions (dash line 24); and the exposures (25) for a camera of the present invention.

When either the SQ motor or the feeding motor is stopped as shown in FIG. 2, since the AF motor can be activated, even if the focus detection calculations between frames are not completed at this point, since lens driving is possible based on the previous focus detection results, the lens is driven based on these results. The lens is driven based on the previous results before the calculation results of the focus detection between frames are output.

Figure 4:
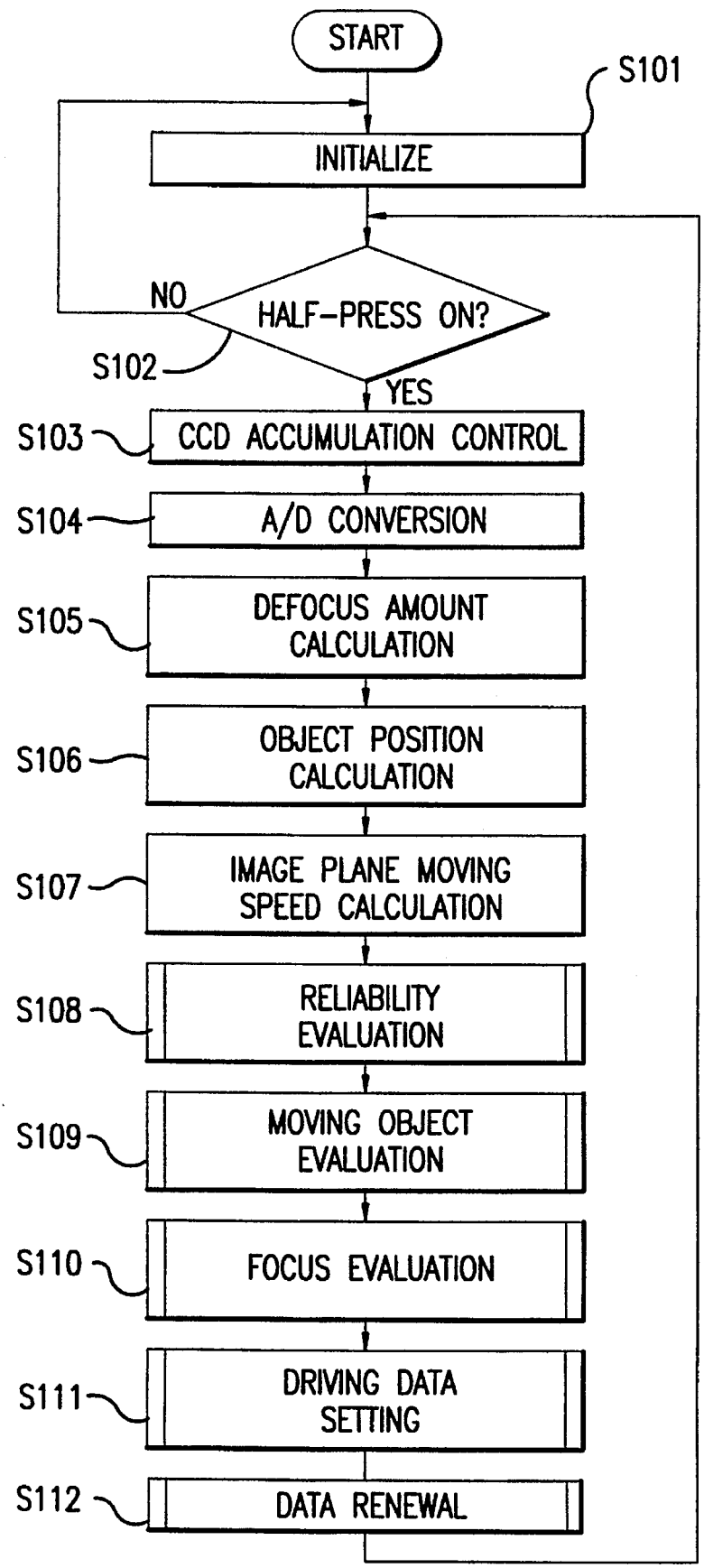
FIG. 4 is a main flow chart for the camera of the first embodiment of the present invention.

The software routine will be described with reference to the flow charts of the drawings. FIG. 4 is the main flow chart of the present invention.

In S101, the memory and flags that will be used are initialized—for example, the defocus amount, central time of accumulation, moving object flag, focus flag, and the like.

In S102, a determination is made as to whether the half-press switch is "on." If the switch is not "on," the program returns to S101; if the switch is "on," the program proceeds to S103.

In S103, the sub-routine of the accumulation control is accomplished. In the accumulation control sub-routine, the commencement and ending of CCD accumulation are controlled, and the average lens position during accumulation is calculated by monitoring the feedback pulse from the encoder 10. In the accumulation control sub-routine, the feedback pulse of the encoder 10 from the commencement of accumulation to the end of accumulation is integrated in order to calculate the average lens position LP0 during accumulation, and the average lens position LP0 is calculated. The camera begins lens communication at the central time of accumulation T0 in order to obtain the lens information (defocus amount/lens driving amount conversion coefficients, beginning F-value, focal length, and the like) at time T0. The lens unit is arranged so as to send lens information when lens communication commences.

In S104, the analog signal that has been photoelectrically converted in the accumulation control sub-routine undergoes A/D conversion and is stored in the memory within the CPU 7.

In S105, a commonly-known defocus amount calculating sub-routine is accomplished. The defocus amount DF0 is calculated based on the photoelectrically converted signal that has been stored in the memory.

In step S106, the target position P0 of the object is calculated. The object target position P0 indicates the object position at the central time of accumulation T0. The calculation of the object target position P0 is calculated as next described. First, the defocus amount DF0 is converted into the lens movement amount DP0 based on the feedback pulse conversion. This calculation is done according to the following formula (1), using the two defocus amount/lens driving amount conversion coefficients KL and L obtained at the current central time of accumulation and the lens driving amount/pulse conversion coefficient KB (a fixed value in the body).

$$DP0 = KB \times KL \times DF0/(1 - L \times DF0) \quad (1)$$

Since the defocus amount DF0 obtained in the current focus detection corresponds to the defocus amount at the average lens position during the current accumulation, the object target position is calculated according to the following formula (2).

$$P0 = DP0 + LP0 \quad (2)$$

In order to accurately calculate the object target position, the defocus amount/lens driving amount conversion coefficients at the average lens position LP0 during accumulation are necessary, but in this embodiment, in order to simplify the description, it is assumed that the difference between the defocus amount/lens driving amount conversion coefficients obtained at the central time of accumulation and the defocus amount/lens driving amount conversion coefficients at the average lens position during accumulation is negligible.

In S107, the image plane moving speed S0 and the focus position changing speed SP0 are calculated.

In S108, the confidence value J0 of the currently detected defocus amount is calculated. The confidence value J0 is an amount that indicates whether the current defocus amount is reliable, based on the previous defocus amount that has been stored.

In S109, a determination is made as to whether the object is a moving object, based on the current defocus amount and the previous focus detection information (the defocus amount, the average lens position, and the central time of accumulation) that has been stored.

In S110, a determination is made as to whether the lens is within the current focus tolerance width.

In S111, the controlling amounts necessary for actually carrying out the lens driving are calculated. In the case of a stationary object, the object target position is calculated; in the case of a moving object, the object target position and the lens movement target speed are calculated.

In S112, when the confidence value that is the result of the current focus detection is above a specified value in the sub-routine that renews that data, the object target position, image plane moving speed, focus position changing speed, central time of accumulation, and confidence value calculated from the current focus detection results are stored and used for the next lens driving. When the confidence value is below a specified value, the above-mentioned data is not stored. If it is determined that the previous data that is stored is not necessary, the previous data is all cleared.

Each sub-routine of various steps of the main flow chart of FIG. 4 will be described hereafter.

The image plane moving speed calculating sub-routine will first be described.

The image plane moving speed calculating sub-routine calculates the moving speed of the image plane (the image plane moving speed) that occurs through the movement of the object, assuming that the position of the lens is fixed, and the changing speed of the lens position (the focus position changing speed) as the object is kept in focus at different time intervals. The image plane moving speed is used in evaluating a moving object, and the focus position changing speed is used for controlling the lens movement. The calculation method for the image plane moving speed and the focus position changing speed are described with reference to FIG. 5 where the subject position is shown by solid line 26 and the image position by solid line 27. The defocus amount is the relative position from a predetermined image plane (the film conjugate plane) to the image plane of the observed object. Since the coefficient for changing the defocus amount through movement of the lens generally differs according to the position of the lens, without a ratio coefficient being realized, the defocus amounts at different lens positions cannot be added or subtracted. Thus, in order to calculate the image plane moving speed, the relative value DP1' of the object position at the previous central time of accumulation, as seen from the lens position at the current central time of accumulation, is calculated through the following formula (3).

$$DP1'=P1-LP0 \tag{3}$$

where P1 is the previous object target position.

The relative value DP1' is next converted according to the following formula (4) to a corresponding defocus amount DF1', using the defocus amount/lens driving amount conversion coefficients obtained at the current central time of accumulation.

$$DF1'=DP1'/(KB \times KL+DP1' \times L) \tag{4}$$

The image plane moving speed S0 is calculated according to the following formula (5), using the current defocus amount DF0, the defocus amount DF1' at the previous central time of accumulation, as seen from the lens position at the current central time of accumulation, and the time interval between the two.

$$S0=(DF0-DF1')/(T0-T1) \tag{5}$$

Figure 5:
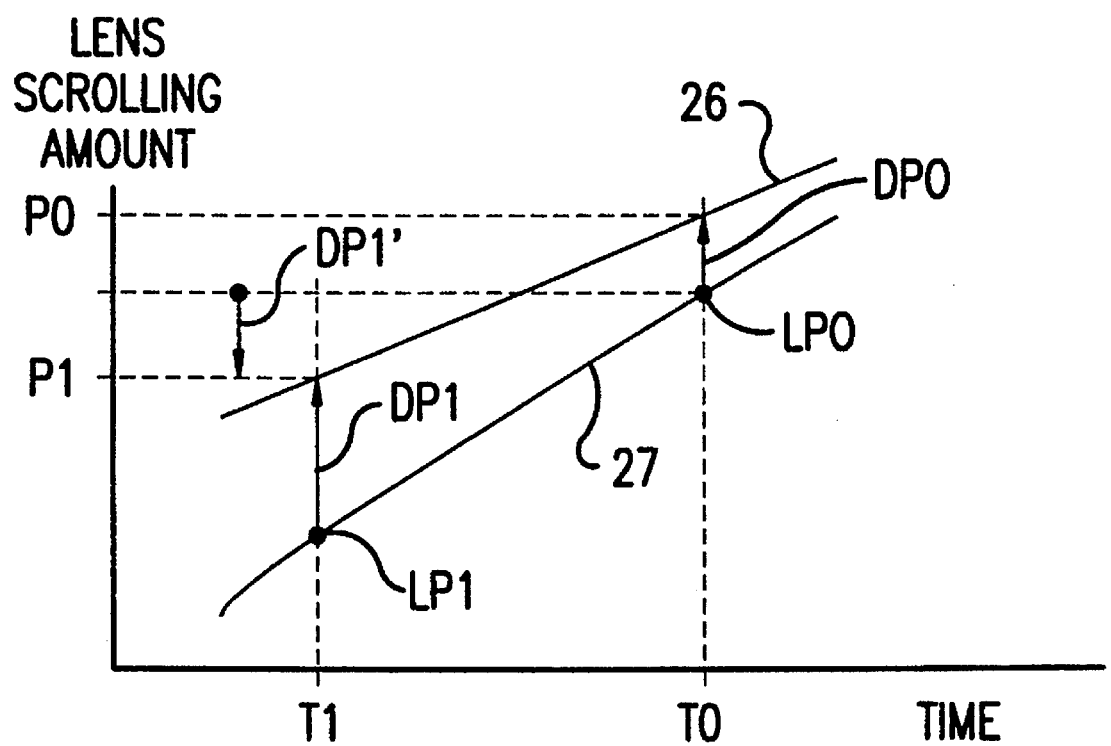
FIG. 5 is a graph of lens scrolling amount versus time with subject and image position lines for calculating the image plane moving speed for the first embodiment of the present invention.

The calculation method for the focus position changing speed is described based on FIG. 5. The focus position changing speed SP0, which is the amount that the focus lens position changes per unit time, is calculated through the following formula (6) from the object position P1 that is used to focus the object at the previous central time of accumulation T1, the object position P0 which is used to focus the object at the current central time of accumulation T0, and the time interval between the two.

$$SP0=(P0-P1)/(T0-T1) \tag{6}$$

The present embodiment uses the current and previous focus detection results in order to calculate the image plane moving speed and the focus position changing speed. The current results and the results between the previous cycle of exposures and/or the cycle before the previous cycle and/or a prior cycle may also be used.

Figure 6:
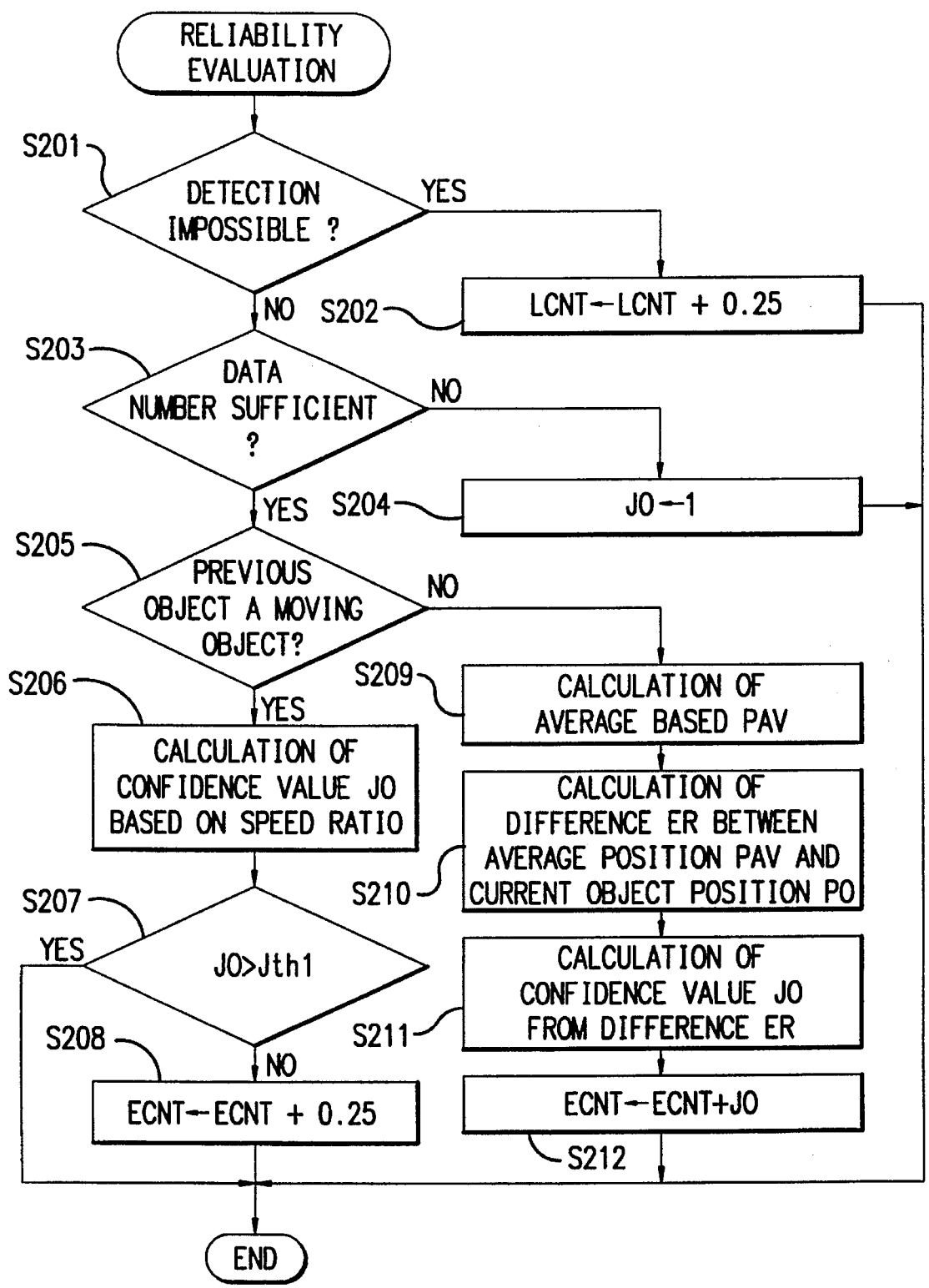
FIG. 6 is the flow chart for the reliability evaluation of the first embodiment of the present invention.

The reliability determining sub-routine will next be described with reference to FIG. 6 and each of the following steps S.

In S201, a determination is made as to whether current focus detection is impossible. If focus detection is impossible, it is because the reliability cannot be calculated. If detection is impossible, the program proceeds to S202.

In S202, 0.25 is added to the variable LCNT, which shows that focus detection is impossible. This is used to clear the previous focus detection information when detection is impossible four times in succession.

In S203, a determination is made as to whether there is sufficient data to evaluate the reliability. If there is not sufficient data, since the reliability cannot be evaluated, the program proceeds to S204 in order to set the current confidence value J0 to one.

In S205, a determination is made as to whether the previous object was a moving object. In the case of a moving object, the program proceeds to S206 in order to carry out the confidence value calculation through the image plane moving speed ratio. If the object is not a moving object, the program proceeds to S209 in order to calculate the confidence value through the difference of effective position data from the average position. In the case of a stationary object, when the confidence value calculation through the image plane moving speed ratio is accomplished, since a small amount of image plane moving speed arises through distance measuring errors and the like, an accurate confidence value cannot be calculated. Therefore, when the previous object was not a moving object, the confidence value is calculated based on the deviation from the average object target position of the effective position data.

Figure 7:
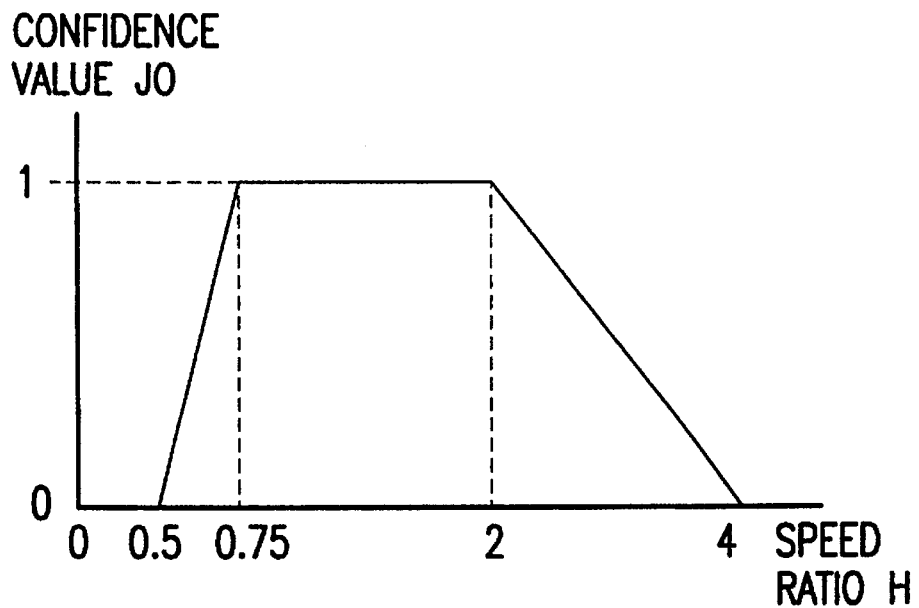
FIG. 7 is a graph of confidence value versus image plane moving speed ratio when the object in the previous cycle was a moving object for the first embodiment of the present invention.

In S206, a confidence value is calculated for the previous defocus amount for the case in which the previous object was a moving object. The confidence value J0 is calculated according to the image plane moving speed ratio H, as shown in FIG. 7. When the image plane moving speed ratio H is 0.75 to 2, the confidence value is one; when the image plane moving speed ratio H is 0.5 to 0.75 or 2 to 4, the confidence value J0 takes a value from zero to one. In areas outside those mentioned, the confidence value J0 becomes zero. When the object image plane moving speed is the same as for the previously calculated object, the object image plane moving speed ratio becomes one based on little change in acceleration of the image plane moving speed. Even when there is an acceleration change, if not much time has passed from the detection of the previous image plane moving speed, the value becomes 0.75 to 2, with one as the center. Object jumping and distance measuring area shifting can be detected by examining the image plane moving speed ratio H.

In S207, a determination is made as to whether the confidence value J0 calculated in S206 is larger than a specified value Jth1. If J0 is not above a specified value Jth1, the program proceeds to S208 and adds 0.25 to the confidence value accumulation value ECNT. The specified value Jth1 takes a value from 0.2 to 0.5. Since the confidence value accumulation value ECNT continues to increase when a state with no reliability, such as panning, has continued, ECNT is used as the specified value for clearing the previously stored data. In this embodiment, when a state in which the confidence value on a moving object is less than the specified value Jth1 continues for four cycles, the previously stored data is cleared.

In S209, the average position PAV of the stored effective position data is calculated through the following formula (7).

$$PAV=(P1+P2+P3+\ldots+P6)/6 \qquad (7)$$

This formula shows the case in which there are six effective position data. The case is shown in which the average of all effective position data is taken as the average position PAV, but the average of two to three data among the most recent effective position data may also be taken.

Figure 8:
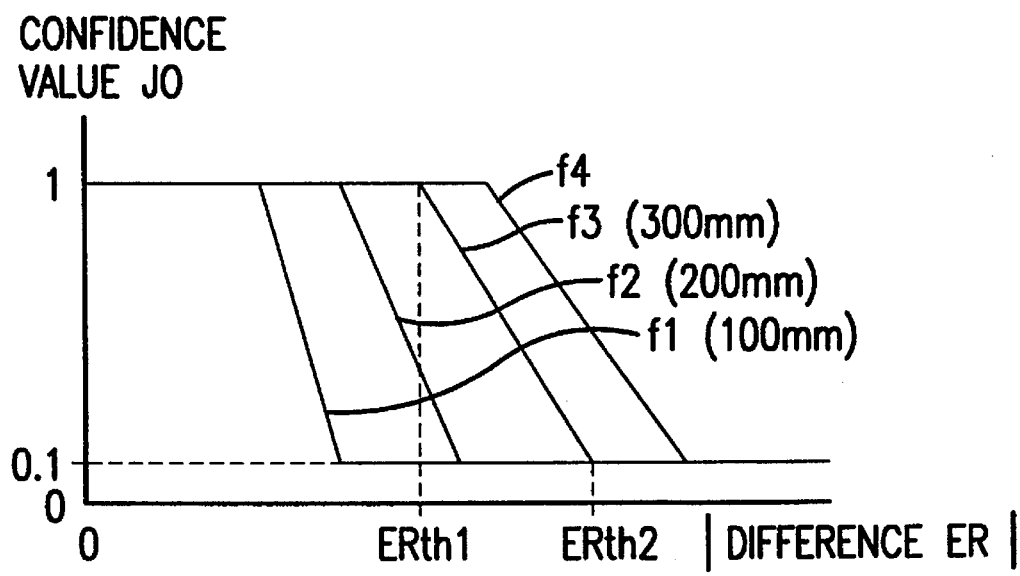
FIG. 8 is a graph of confidence value versus the average object position when the object in the previous cycle was a stationary object for the first embodiment of the present invention.

In S210, the difference ER between the current object position P0 and the average position PAV is calculated. In S211, the confidence value J0 is calculated based on the difference ER, as shown in FIG. 8. The confidence value J0 depends on the difference ER and the focal length f of the photo lens. J0 depends on the focal length because when the photographic distance changes by the same amount, the object target position becomes larger as the focal length gets longer. The confidence value J0 is one when the difference ER is zero to ERth1, a value from zero to one when the difference ER is ERth1 to ERth2, and 0.1 above ERth2. J0 does not become zero above ERth2 because when a state continues in which the confidence value J0 is below a specified value Jth1, the stored previous defocus amount is cleared because it is assumed that the photographer has intentionally changed the object. The specified values ERth1 and ERth2 are shown in the following table.

|  | f1<br>f < 150 mm | f2<br>150 ≦ f < 250 | f3<br>250 ≦ f < 350 | f4<br>350 mm < f |
| --- | --- | --- | --- | --- |
| ERth1 | 5 mm | 7.5 mm | 10 mm | 12.5 mm |
| ERth2 | 8 mm | 10.5 mm | 13 mm | 15.5 mm |

In S212, the current confidence value J0 is added to the confidence value accumulation value ECNT.

Figure 9:
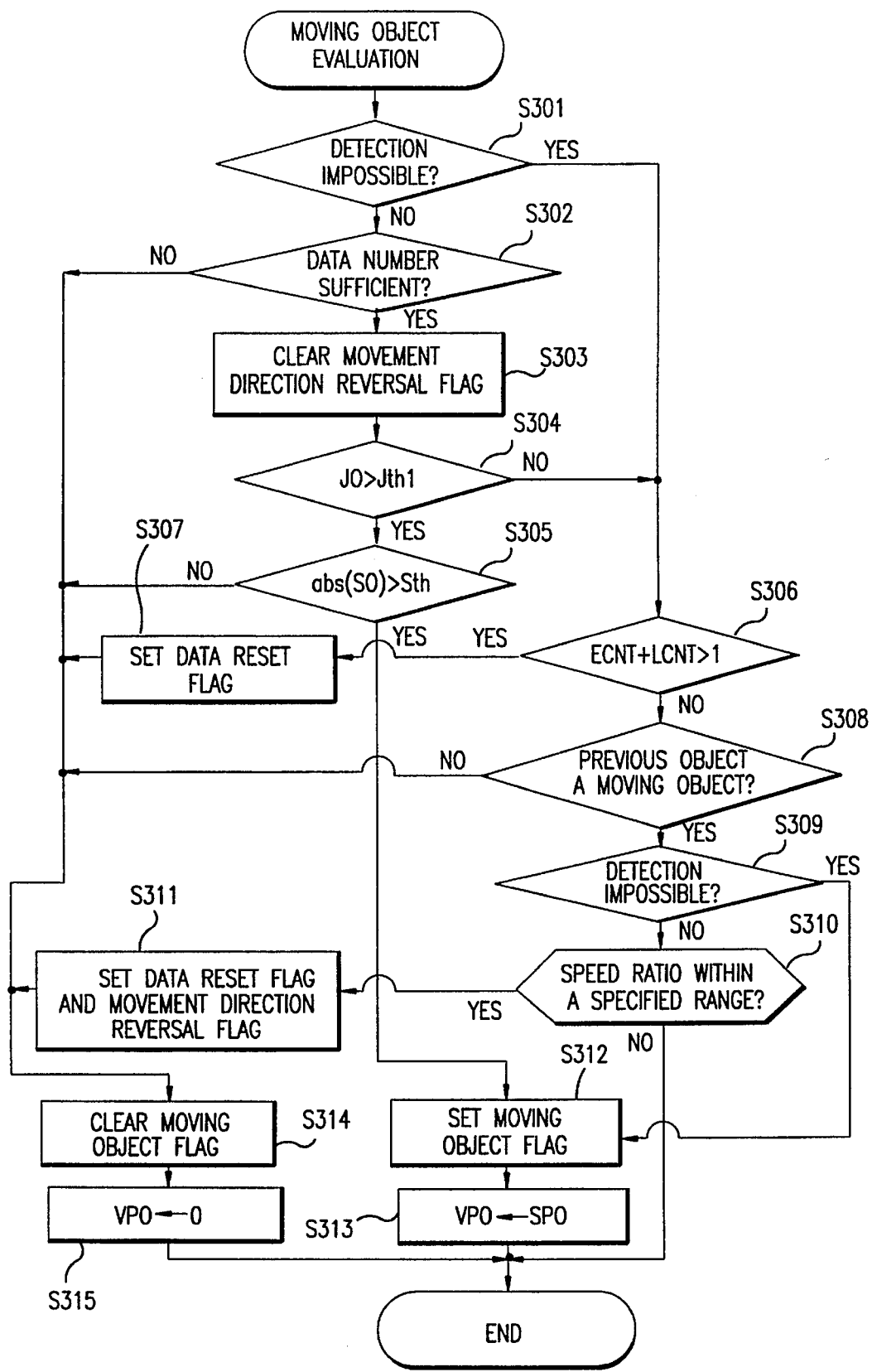
FIG. 9 is a flow chart for the moving object evaluation of the first embodiment of the present invention.

The moving object evaluating sub-routine will next be described with reference to FIG. 9 and each of the following steps S.

In S301, a determination is made as to whether current focus detection is impossible. If detection is impossible, the program advances to S306 in order to investigate continuity of detection impossibility.

In S302, a determination is made as to whether the number of effective position data is sufficient for carrying out the moving object evaluation.

If the effective position data are sufficient, the program proceeds to S303 and accomplishes the moving object evaluation. If there are not sufficient effective position data stored, the program advances to S314, clears the moving object flag, and the object is treated as a stationary object in the current cycle.

In S303, the movement direction reverse rotation flag is cleared.

In S304, a determination is made as to whether the current confidence value J0 is larger than a specified value Jth1. If J0 is larger than Jth1, the moving object evaluation progresses further because the current defocus amount is reliable. If J0 is less than Jth1, the program advances to S306 in order to investigate the continuity of detection impossibility.

In S305, a determination is made as to whether the image plane moving speed S0 is above a specified value Sth. If the absolute value of S0 is greater than Sth, since it can be determined that the object is moving, the program advances to S312 and sets the moving object flag.

In S306, when current detection is impossible, if the current confidence value is low, a determination is made as to whether the state mentioned is continuing successively. If the sum of the confidence value accumulation value ECNT and the detection impossible accumulation value LCNT is greater than one, since the above-mentioned state is continuing successively, the program proceeds to S307 and sets the data reset flag in order to clear the previous data that is stored. If the sum of ECNT and LCNT is less than one, since the above-mentioned state has not continued long, the program advances to S308 because the stored data is not cleared.

In S308, a determination is made as to whether the previous object is a moving object. If the previous object is not a moving object, since the confidence value is low, the program advances to S314 in order to determine that the object is stationary, as it was in the previous cycle. If the previous object is a moving object, the program proceeds to S309 in order to determine whether the object is moving, as it was in the previous cycle.

In S309, a determination is made as to whether current detection is impossible. If detection is impossible, the program advances to S312 in order to determine that the object is moving, as it was in the previous cycle, and sets a moving object flag. If detection is not impossible, since there is a possibility that the confidence value has decreased through the reverse rotation of the object movement direction, the program proceeds to S310 in order to make this determination.

In S310, a determination is made as to whether the image plane moving speed ratio H is within a specified range. If H is within the specified range, since it can be determined that the object movement direction is reversing, the program proceeds to S311 and sets the data reset flag and the movement direction reversal flag. The specified range is −2<H<0.5. A movement direction change occurs when an object passes in front of the object being followed. The image plane moving speed ratio H in this case is in the range of −2<H<0.5. If the image plane moving speed ratio H is less than −2, there is a high probability that an object has not passed in front of the object being followed, but that instead the object has passed out of the distance measuring frame. Therefore, in this case, since the movement direction reversal flag is not set, the object is treated as being the same as in the previous cycle.

In S312, since the object is treated as a currently moving object, the moving object flag is set.

In S313, since the lens movement speed is controlled by the focus position changing speed SP0 in order to follow the changing in focus position through the object movement, the focus position changing speed SP0 is used for the lens movement controlling speed VP0.

In S314, the moving object flag is cleared in order to treat the current object as a stationary object.

In S315, since the object is stationary, the lens movement controlling speed VP0, for which there is no change in focus position over time, is set to zero.

The focus evaluating sub-routine will next be described with reference to FIG. 10 and FIG. 11.

Figure 10:
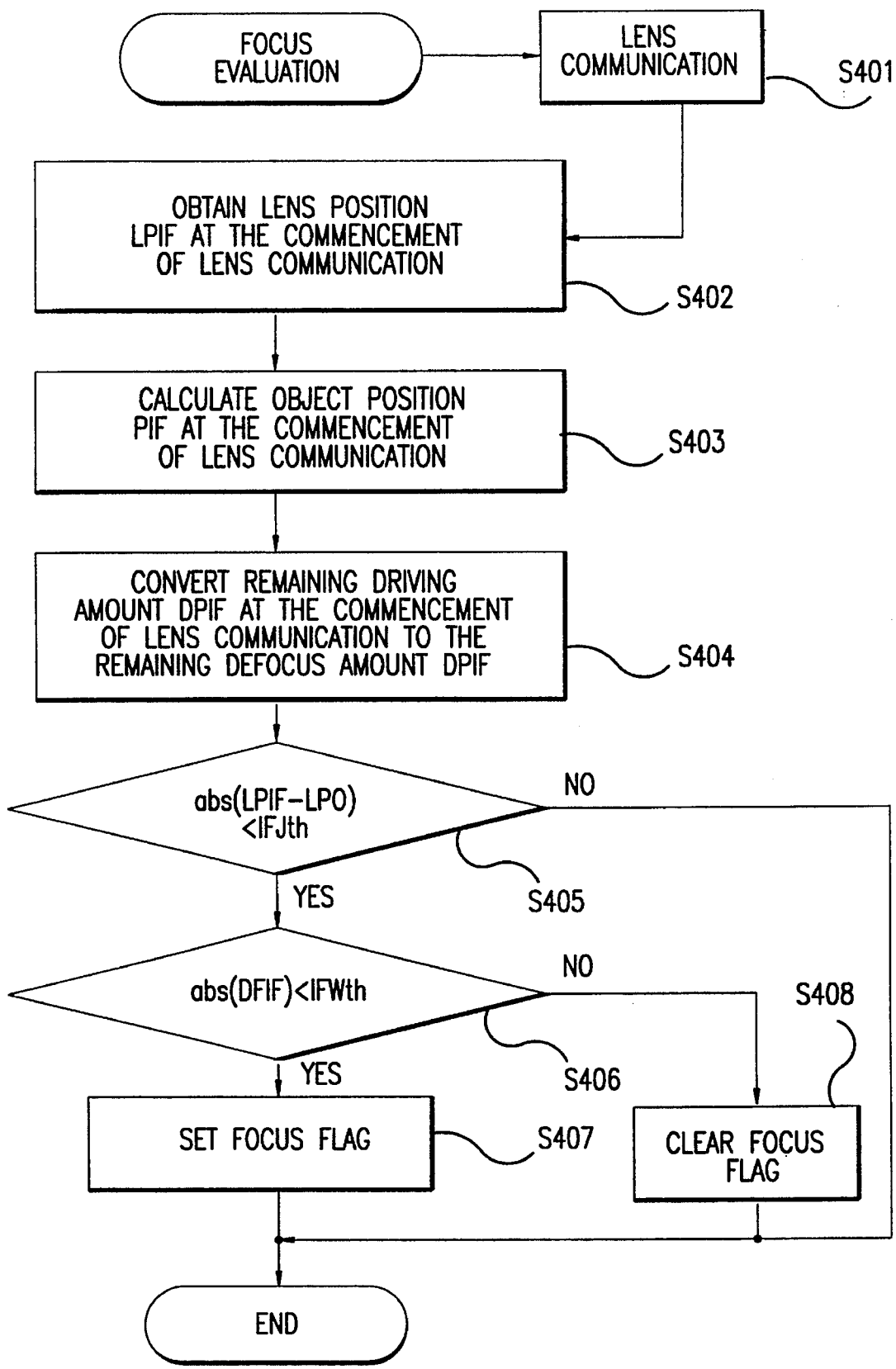
FIG. 10 is a flow chart for the focus evaluation of the first embodiment of the present invention.
Figure 11:
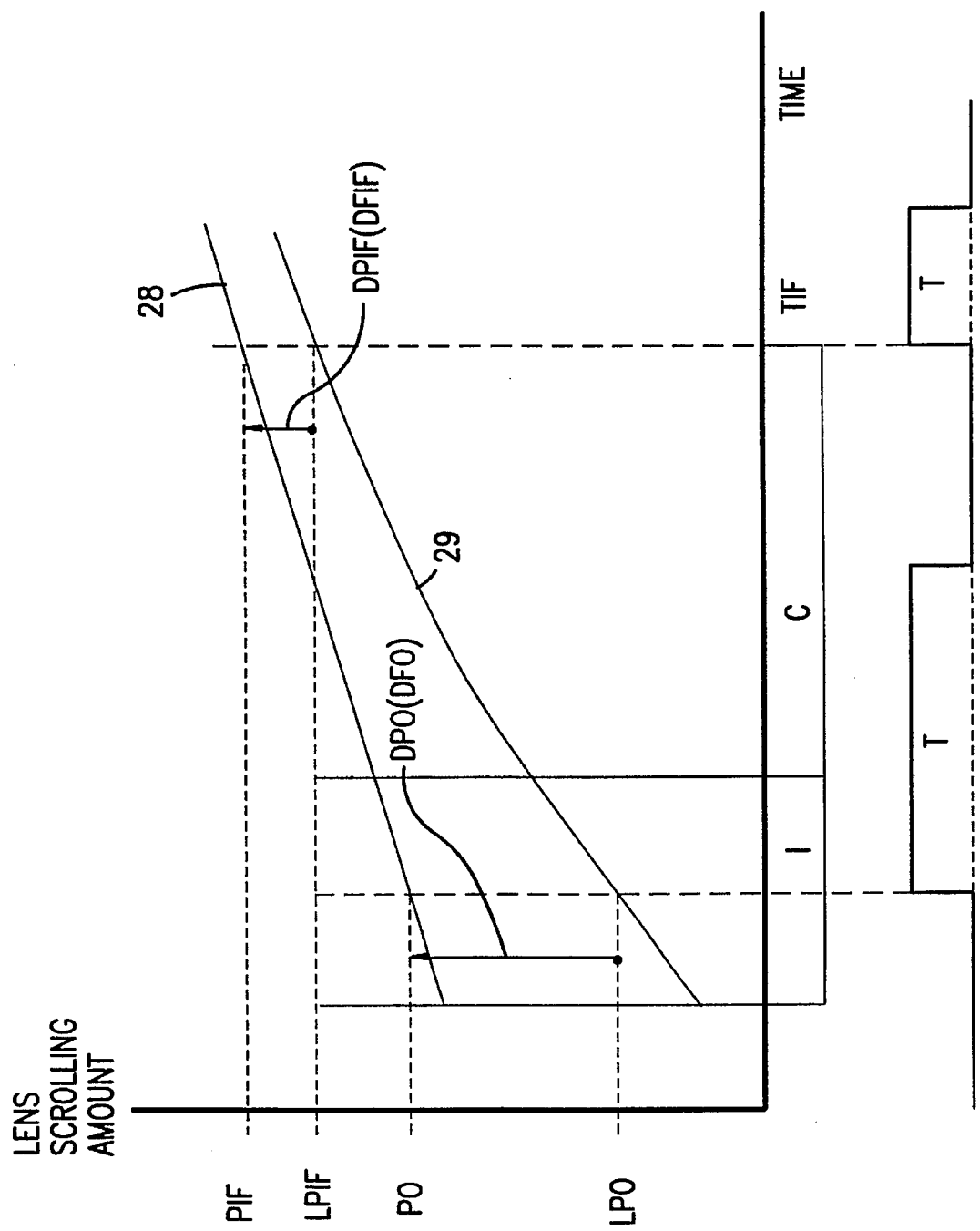
FIG. 11 is a graph of lens scrolling amounts versus time with subject and image position lines and lens communication times of the first embodiment of the present invention.

FIG. 11 is a graph of lens scrolling amount versus time with object positions (solid line 28) and lens position (solid line 29) for the calculation of the defocus amount DFIF that is used for focus evaluation. The reference symbols "T," written in FIG. 11 in the area labelled "lens communication," show that data is passing between the body and the lens through lens communication. The reference symbol "I" indicates photoelectric conversion element accumulation, and "C" indicates the time interval of the focus detection calculation. The description of the control will be related to steps S of FIG. 10.

With reference to FIG. 10, in S401, in order to calculate the defocus amount used in evaluating the focus, the defocus amount/lens movement amount conversion coefficients are obtained through lens communication. This is because the defocus amount/lens movement amount conversion coefficients of a lens vary greatly according to the lens position.

In S402, the lens position LPIF at the commencement of lens communication is obtained. This is to calculate the defocus amount DFIF at the focus evaluation (the defocus amount at the commencement of lens communication).

In S403, the object position PIF at the commencement of lens communication is calculated through the following formula (8).

$$PIF = VP0 \times (TIF - T0) + P0 \qquad (8)$$

In this formula (8), TIF indicates the time at which the lens communication of S401 commences.

In S404, the remaining driving amount DPIF at the time of focus evaluation is calculated through the following formula (9).

$$DPIF = PIF - LPIF \qquad (9)$$

The focus evaluation defocus amount DFIF is calculated through the following formula (10) using the remaining driving amount DPIF at the time of focus evaluation and the defocus amount/lens driving amount conversion coefficients obtained from the lens communication of S401.

$$DFIF = DPIF / (KB \times KL + DPIF \times L) \qquad (10)$$

In S405, a determination is made as to whether the amount of lens movement from the current central time of accumulation to the time of focus evaluation is below a specified value IFJth. Since an erroneous focus calculation is accomplished when the amount of lens movement is large, the focus evaluation is not accomplished in the current cycle if the lens movement is larger than the specified value.

In S406, a determination is made as to whether the defocus amount DFIF at the time of focus evaluation is within the focus width IFWth. When DFIF is within the focus width IFWth, the program proceeds to step S407 and sets a focus flag. When DFIF is above the focus width IFWth, the program proceeds to S408 and clears the focus flag.

Figure 12:
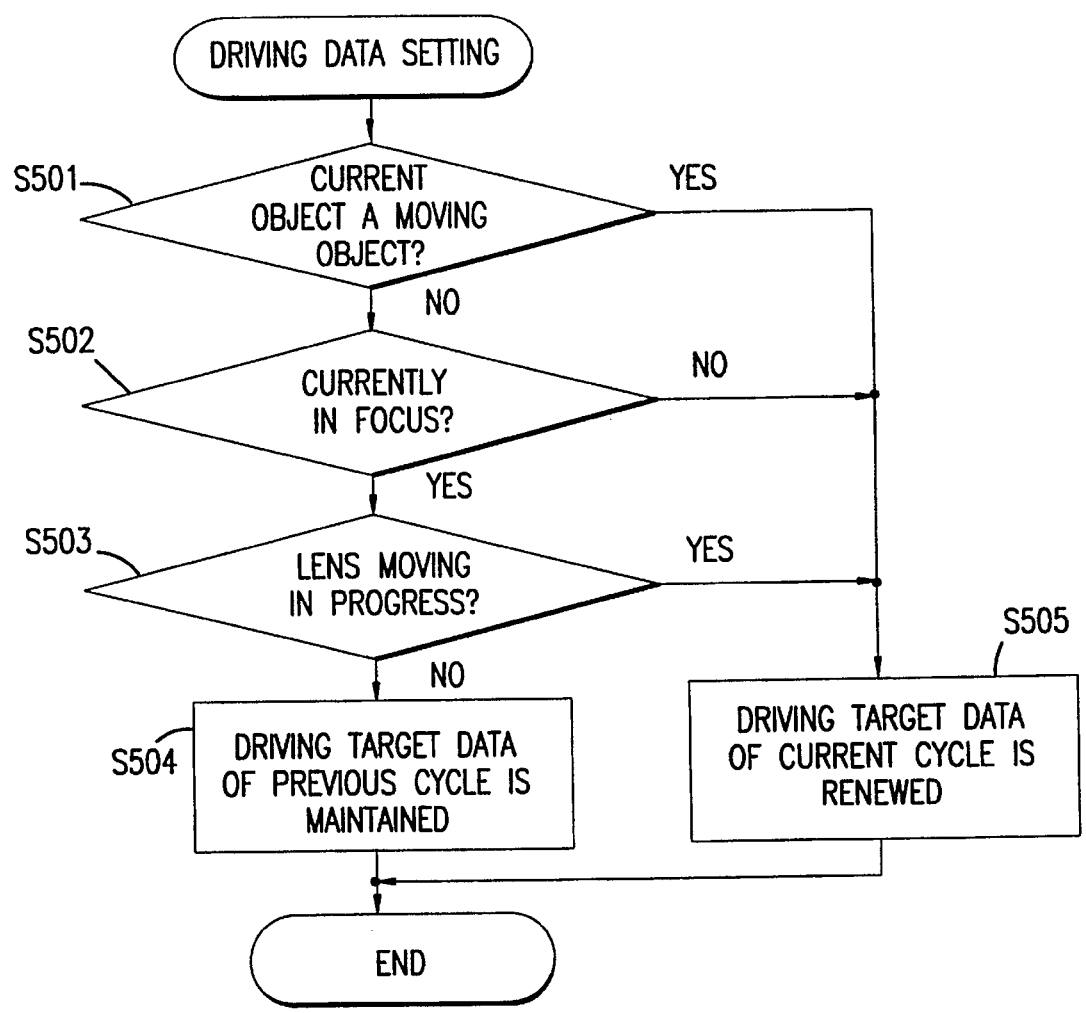
FIG. 12 is a flow chart for the driving data setting of the first embodiment of the present invention.

The driving data setting sub-routine will next be described with reference to FIG. 12 and each of the following steps S.

In S501, it is determined through the moving object flag whether the current object has been determined to be a moving object. In the case of a moving object, since the lens driving is not stopped by the focus evaluation, the currently calculated driving target data is renewed. The driving target data is the object position P0 at the current central time of accumulation and the lens moving target speed VP0 at that time.

Calculated for the current cycle is renewed. S502 is executed when it has been determined in S501 that the current object is not a moving object. If it is not determined in S502 that the system is in focus, the driving target data.

If the system is determined to be in focus, the program proceeds to S503.

In S503, a determination is made as to whether the lens is currently in the state of moving. If the lens is in the state of moving, the driving target data calculated for the current cycle is renewed. If the lens is currently being driven, the lens is driven immediately without stopping to the position at which the defocus amount becomes zero, even if it is within the focus width. If the lens is not currently being driven, since a new lens driving will not be accomplished, in S504 the driving target data of the previous cycle is maintained without renewing the driving target data of the current cycle.

Figure 13:
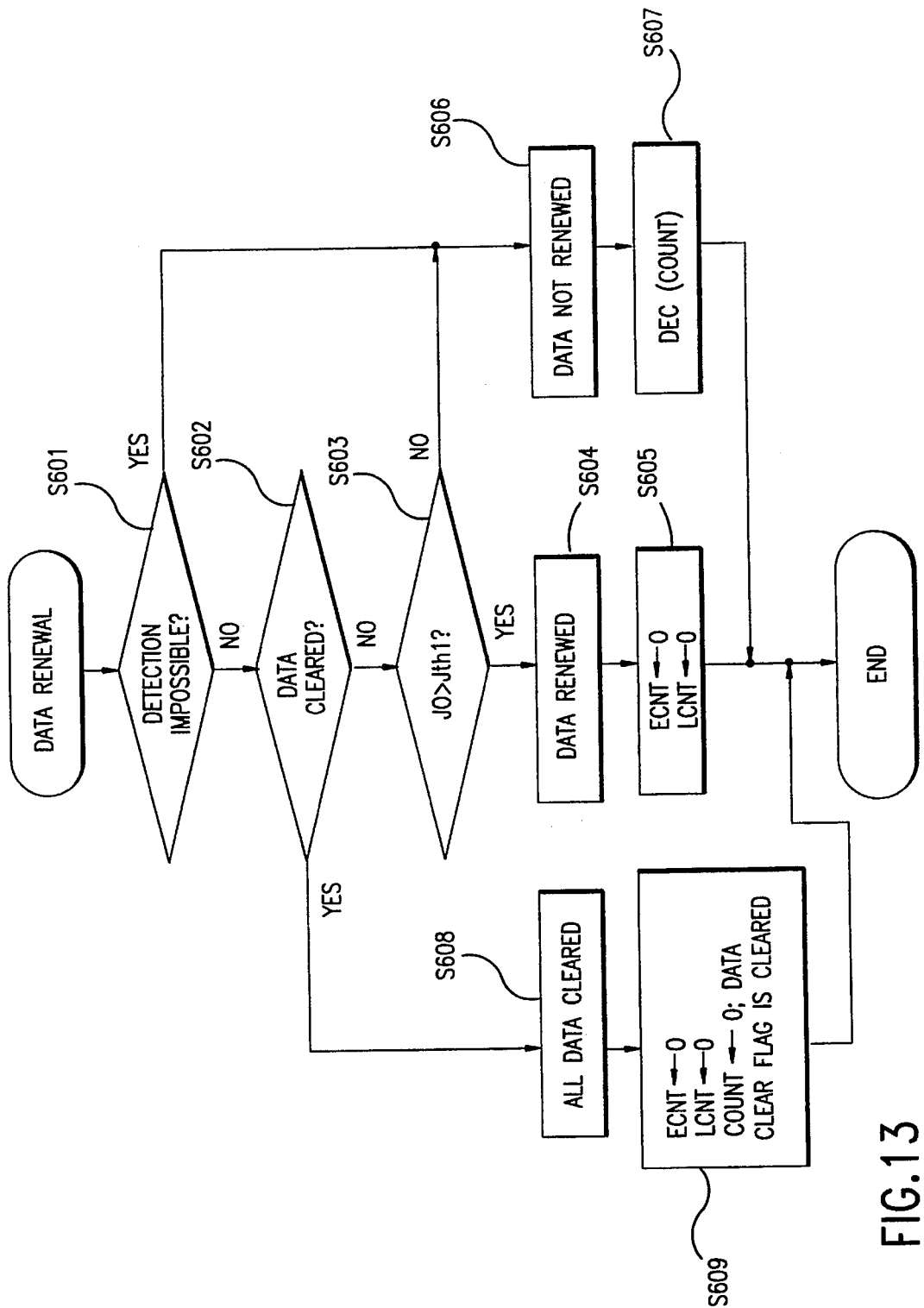
FIG. 13 is a flow chart for data renewing for the first embodiment of the present invention.

The data renewing sub-routine will next be described with reference to FIG. 13 and each of the following steps S.

In S601, a determination is made as to whether detection is impossible in the current cycle. If detection is impossible, the program advances to S606 and does not renew the data. The current central time of accumulation and the confidence value are cleared.

In S602, if there was a data reset flag in the moving object evaluating sub-routine, the program advances to S608 and clears the previous central time of accumulation, object position, image plane moving speed, and focus position changing speed that are stored. This is because when a pre-measured driving through a linear equation could not be accomplished because of intentional panning by the photographer or because of changes in the direction of movement of the object, the previously stored object data are not required.

In S603, a determination is made as to whether the confidence value J0 of the current cycle is above a specified value Jth1. If J0 is above the specified value Jth1, since the defocus amount of the current cycle is reliable, the program proceeds to S604 and stores the central time of accumulation, object position, image plane moving speed, and focus position changing speed of the current cycle.

In S605, the variable ECNT, which shows that a state has continued in which the confidence value is below a specified value, and the variable LCNT, which shows that a state has continued in which detection is impossible, are set to zero.

In S606, the calculated data is not stored based on the focus detection of the current cycle.

In S607, one is subtracted from the counter COUNT, which shows the number of effective position data, since there are no data stored in the current cycle. In S608, the previous data that is stored is all cleared.

In S609, the variable ECNT, the variable LCNT, and the counter COUNT, which shows the number of effective position data, are set to zero, and the data clear flag is cleared.

Figure 14:
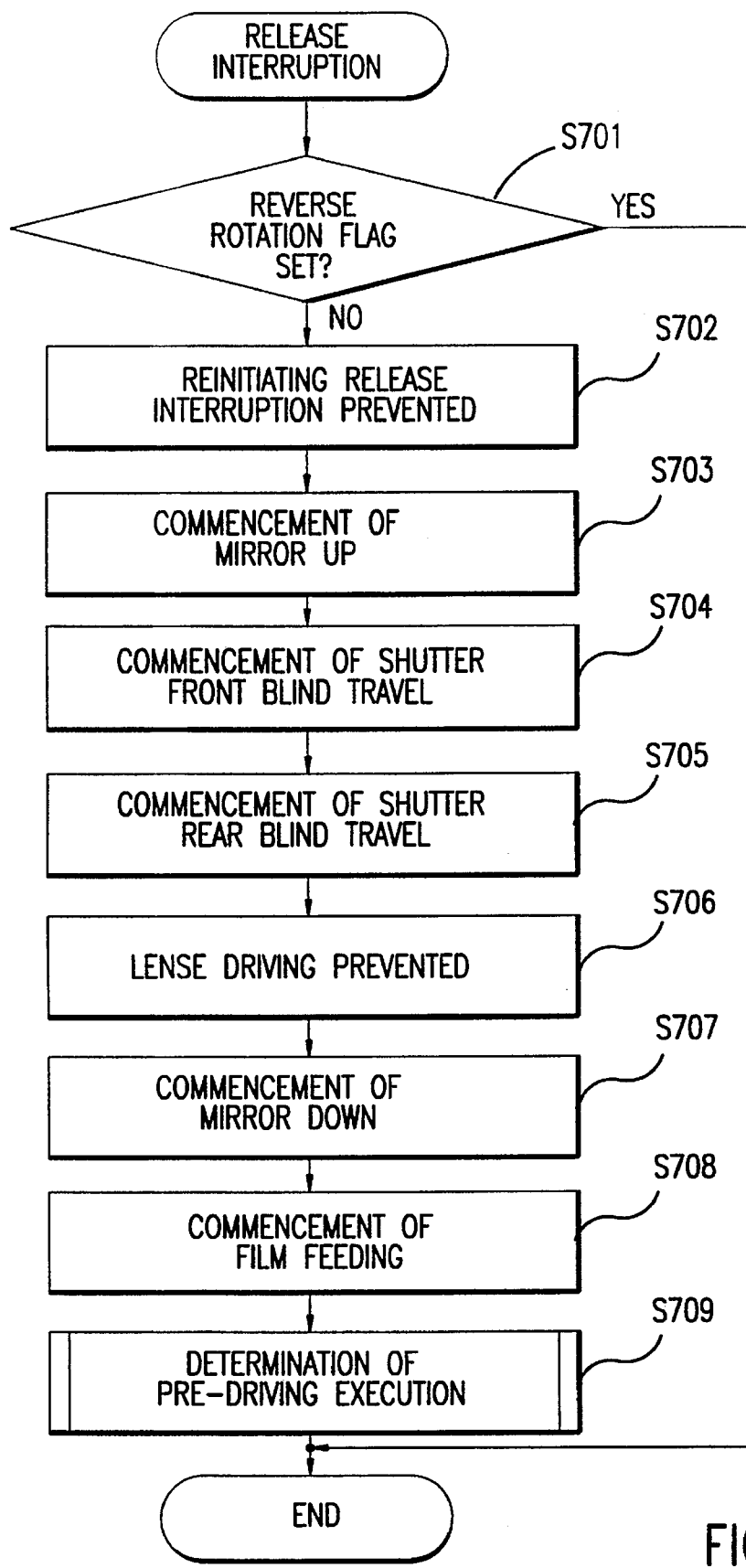
FIG. 14 is a flow chart for the release interruption of the present invention.

The release interruption that occurs when the full-press switch of the operating component 13 is turned "on" will next be described with reference to FIG. 14. In addition to activation through the full-press switch, the release interruption is executed in the same manner when the half-press is "on" and the photographic operations are completed (when the film feeding and shutter operation are completed).

The release interruption is allowed when focus detection is accomplished one time.

The release interruption sub-routine will next be described with reference to FIG. 14 and each of the following steps S.

In S701, a determination is made as to whether a reverse rotation flag has been set. If a reverse rotation flag has been set, directly after the object movement direction has been reversed in rotation, since the number of data necessary for moving object evaluation has not been gathered, it is possible that an out-of-focus picture will be taken if release is allowed in this state. Therefore the release interruption is not executed. If a reverse rotation flag has not been set, the release interruption is executed.

In S702, since the release interruption is in progress, reinitiating release interruption is prevented.

In S703, mirror up is commenced by causing the SQ motor 16 to rotate in the forward direction.

In S704, when mirror up is completed, the travel of the shutter front blind of the shutter 15 commences.

In S705, the travel of the shutter rear blind commences according to the exposure time interval.

In S706, at the same time that the travel of the shutter rear blind commences, the lens driving is stopped.

In S707, when travel of the shutter rear blind stops, mirror down is commenced by causing reverse rotation of the SQ motor.

In S708, film feeding commences after a specified time interval has elapsed from the time of commencement of the mirror down operation. The mirror down commencement time and the film feeding commencement time differ in order to prevent a large sudden increase in current that would occur by simultaneous activation of the SQ motor and of the feeding motor.

In S709, a sub-routine is accomplished which determines whether or not pre-driving will be executed.

Figure 15:
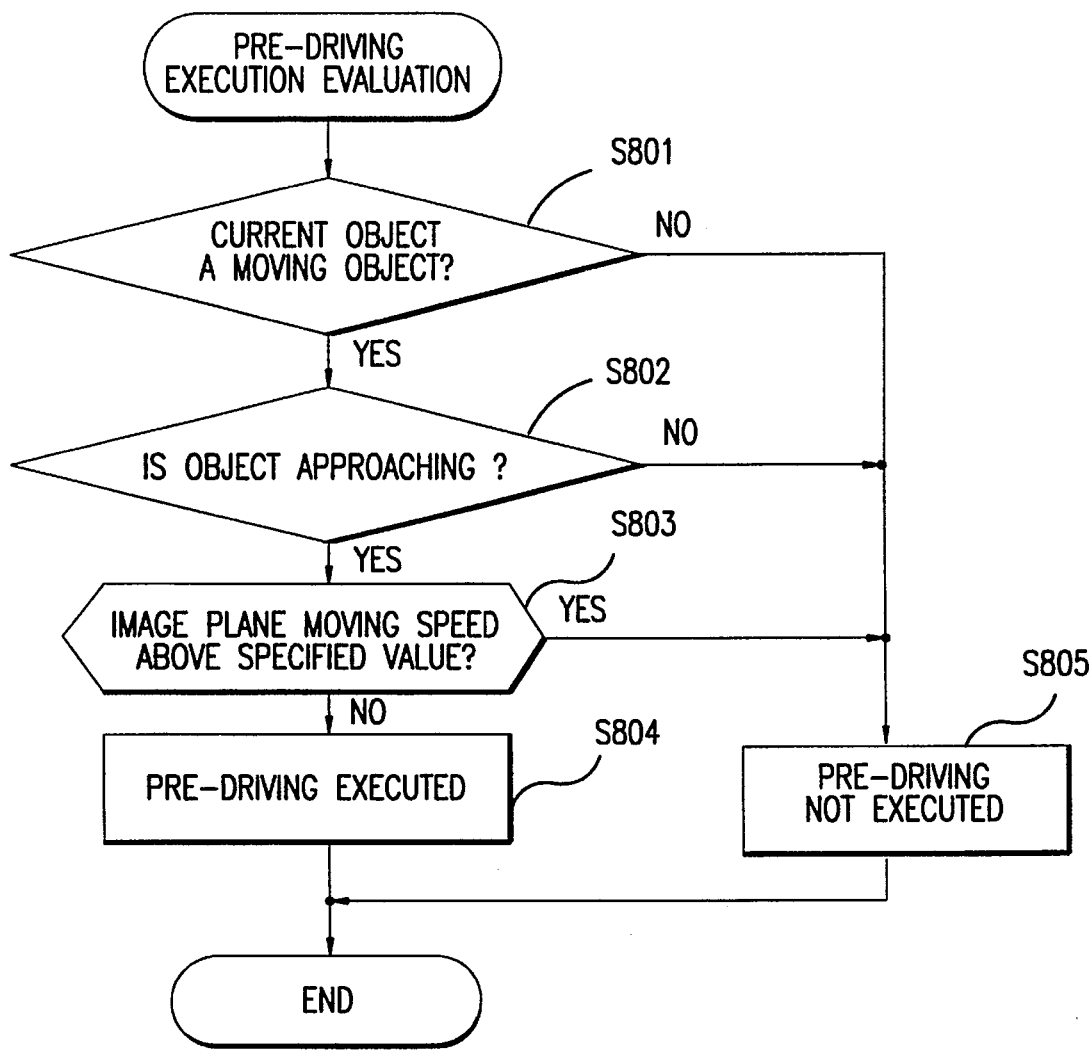
FIG. 15 is a flow chart for the pre-driving execution for the present invention.

The pre-driving execution determining sub-routine will be described with reference to FIG. 15 and each of the following steps S.

In S801, a determination is made as to whether the current object is a moving object. In the case of a moving object, since pre-driving will be accomplished, the program proceeds to S802. In the case of a stationary object, since there will be no problem even if pre-driving is not accomplished and the lens is driven according to the result of the focus detection between frames because the lens has come to the focused position through the lens driving before the previous exposure, the program advances to S805, and pre-driving is not accomplished.

In S802, in the case of a moving object, a determination is made as to whether the object is moving in a direction that approaches the photographer. If the object is approaching, since pre-driving will be accomplished, the program proceeds to S803. If the object is moving farther away, since it is easy to overshoot when a pre-measured driving is accomplished by a linear function, pre-driving is not accomplished.

In S803, a determination is made as to whether the current image plane moving speed is above a specified value. If the image plane moving speed is above the specified value, pre-driving will not be accomplished, and the program advances to S805 where pre-driving is not executed; if the image plane moving speed is below the specified value, pre-driving will be accomplished, and the program proceeds to S804 where pre-driving is executed. This is done in order to prevent pre-driving in cases in which, when an object cuts in front of the camera, the image plane moving speed at the nearest position is large, and since the movement direction reverses in rotation immediately afterward, if pre-driving is accomplished according to the focus detection results of the previous cycle, when the focus detection results between frames are output, the lens will have moved too far. In this case, it is desirable to program a large threshold value of around 30 mm/s for the image plane moving speed. In other words, in states in which there are drastic changes in speed, there will be a reverse effect if pre-driving is accomplished using the previous focus detection results. The same effect can occur with an object that is moving away. For an object that has been determined to be a stationary object, since the image plane moving speed of the previous focus detection results is zero, it is not necessary to carry out pre-driving.

Since it is acceptable to change the threshold value of the image plane moving speed through the focal length of the lens because the image plane moving speed depends on the focal length of the lens, when the movement direction is in reverse rotation, the focus detection begins again after a specified time interval has elapsed after the completion of the mirror down operation, and the program returns to the main flow, beginning with S103 of FIG. 4.

Figure 16:
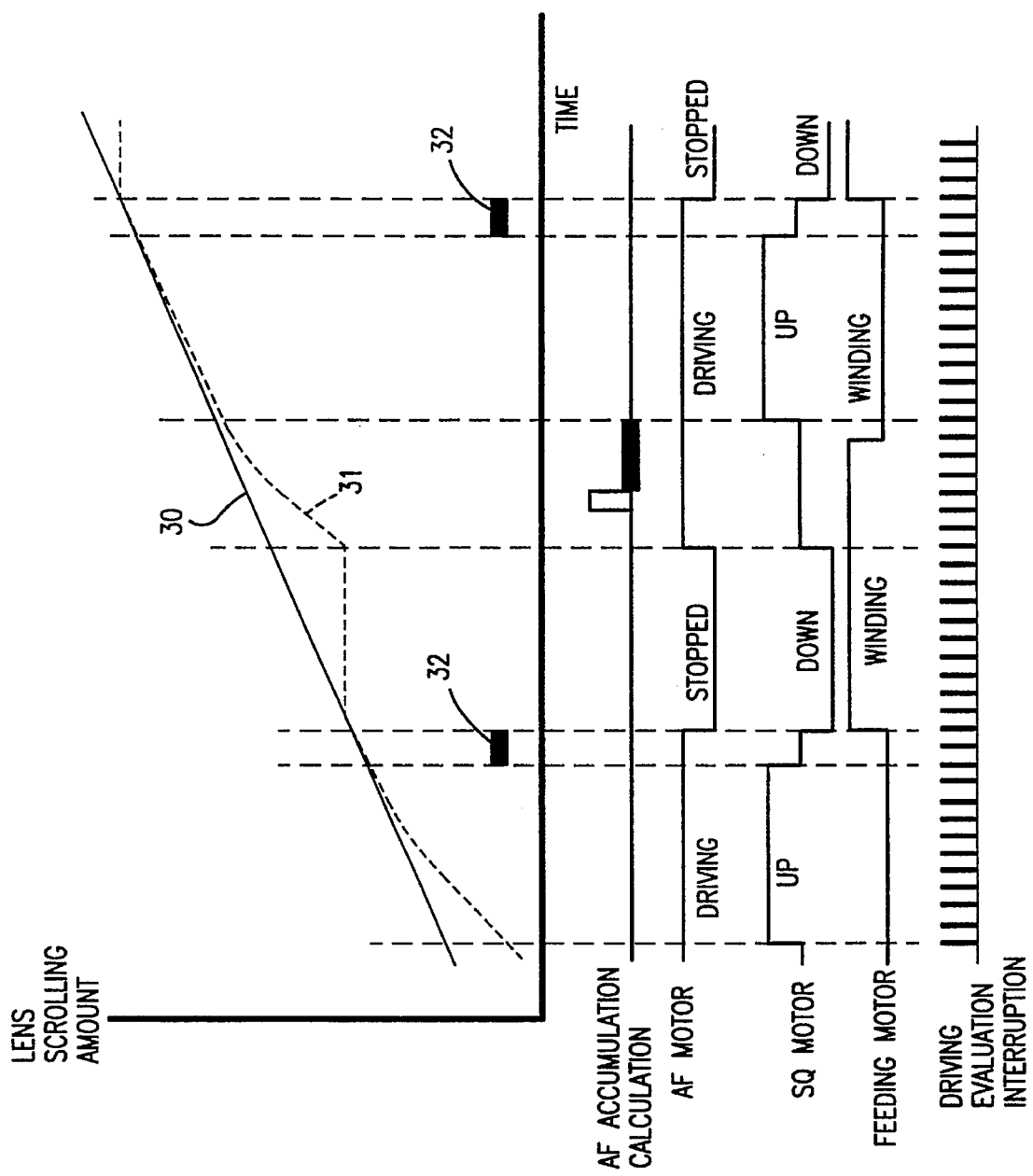
FIG. 16 is a graph like that of FIG. 1 but with driving evaluation interruption times according to a driving second embodiment of the present invention.

A second embodiment of the present invention will next be described with reference to FIG. 16. FIG. 16 is a graph like FIG. 2 of lens scrolling amount versus time that shows the states of and object positions (solid line 30) for a AF motor, SQ motor, and feeding motor, and the lens positions (dash line 31), the exposures (darkened boxes 32) and driving evaluation interruptions for the present invention.

Driving evaluation for the pre-driving in FIG. 2 is accomplished every few milliseconds.

The pre-driving program is activated and interrupts the main program in all states, such as during the AF accumulation calculation, AF motor driving, SQ motor driving, feeding motor driving, and the like. In other words, the pre-driving is executed during any state (AF accumulation calculation, AF motor driving, SQ motor driving, feeding motor driving, and the like) that the evaluating circuit allows.

According to the present invention, by carrying out pre-driving, which causes the lens to be driven based on the previous focus detection results, the time interval during which lens driving is possible can be prolonged by the space between frames, which is the period between consecutive exposure controlling operations during continuous photography, and a focused picture can be taken, even for an object with a rapid image plane moving speed.

In addition, by providing a pre-driving prevention device, pre-driving is prevented when the object is not a moving object. Unnecessary driving can be omitted by using the focus detection results of the previous cycle, and consumption of electricity can be kept to a minimum.

In the illustrated embodiments, a CPU has been disclosed as a controller to control the various operations of the automatic focus adjustment detection device. However, the controller may be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or login circuits such as discrete element circuits, or programmable logic devices such as PLDs, PLAs, PALs or the like). The controller can also be implemented using a suitably programmed general purpose computer, e.g., a microprocessor, microcontroller or other processor device (CPU as disclosed or MPU), either alone or in conjunction with one or more peripheral (e.g., integrated circuit) data and signal processing device. In general, any device or assembly of devices on which a finite state machine capable of implementing the flowcharts shown in FIGS. 4, 6, 9, 10, 12–14 and 15 can be used as the controller. As shown, a distributed processing architecture is preferred for maximum data/signal processing capability and speed.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. An automatic focus adjustment device, comprising a camera capable of continuous photography that is equipped with:

a phototaking lens;

focus detection means for repeatedly detecting the focus adjustment state of said phototaking lens and for outputting focus detection results at each detection of said focus adjustment state;

memory means for storing said focus detection results; and driving means for, in at least a portion of the time between a first and a second exposure during continuous photography, selectively driving said phototaking lens based on focus detection results obtained by said focus detection means and stored in said memory means before said first exposure and based on focus detection results obtained by said focus detection means after said first exposure.

2. The automatic focus adjustment device of claim 1, further comprising evaluating means for determining, before focus detection results are obtained after said first exposure, whether said phototaking lens will be driven by said driving means based on said stored focus detection results.

3. The automatic focus adjustment device of claim 2, wherein said evaluating means comprises:

moving object evaluating means for determining whether an object is a moving object or a stationary object; and stopping means for stopping driving of said phototaking lens by said driving means when said moving object evaluating means determines that said object is a stationary object.

4. The automatic adjustment device of claim 2, wherein said evaluating means comprises:

image plane moving speed calculating means for calculating an image plane moving speed; and stopping means for stopping driving of said phototaking lens by said driving means when said image plane moving speed calculating means determines that said image plane moving speed is greater than a predetermined value.

5. The automatic adjustment device of claim 2, further comprising:

object movement direction evaluating means for determining whether an object is moving closer to or away from said camera; and stopping means to stop driving of said phototaking lens by said driving means when said object movement direction evaluating device determines that said object is moving away from said camera.

6. The automatic adjustment device of claim 2, wherein said stored focus detection results comprise an image plane moving speed and a defocus amount.

7. The automatic adjustment device of claim 2, wherein said stored focus detection results comprise a lens driving amount and a focus position changing speed.

8. The automatic adjustment device of claim 2, wherein said stored focus detection results comprise the two most recent focus detection results output by said focus detection means.

9. The automatic adjustment device of claim 2, wherein said stored focus detection results comprise the most recent focus detection results and prior focus detection results not immediately preceding said most recent focus detection results output by said focus detection means.

10. An automatic focus adjustment device, comprising a camera capable of continuous photography that is equipped with:

a phototaking lens;

a focus detection device to repeatedly detect the focus adjustment state of said phototaking lens and to output focus detection results at each detection of said focus adjustment state;

a memory device to store said focus detection results; and a driving device to, in at least a portion of the time between a first and a second exposure of successive frames during continuous photography, selectively drive said phototaking lens based on focus detection results obtained by said focus detection device and stored in said memory device before said first exposure and based on focus detection results obtained by said focus detection device after said first exposure.

11. The automatic focus adjustment device of claim 10, further comprising an evaluating device to determine, before focus detection results are obtained after said first exposure, whether said phototaking lens will be driven by said driving device based on said stored focus detection results.

12. The automatic adjustment device of claim 11, wherein said evaluating device comprises:

a moving object evaluating device to determine whether an object is a moving object or a stationary object; and a stopping device to stop driving of said phototaking lens by said driving device when said moving object evaluating device determines that said object is a stationary object.

13. The automatic adjustment device of claim 11, wherein said evaluating device comprises:

an image plane moving speed calculating device to calculate an image plane moving speed; and a stopping device to stop driving of said phototaking lens by said driving device when said image plane moving speed calculating device determines that said image plane moving speed is greater than a predetermined value.

14. The automatic adjustment device of claim 11, wherein said evaluating device comprises:

an object movement direction evaluating device to determine whether an object is moving closer to or away from said camera; and a stopping device to stop driving of said phototaking lens by said driving device when said object movement direction evaluating device determines that said object is moving away from said camera.

15. A method of automatically focusing an automatic focus adjustment device including a camera with a phototaking lens capable of continuous photography, comprising the steps of:

repeatedly detecting the focus adjustment state of said phototaking lens and outputting focus detection results at each detection of said focus adjustment state;

storing output focus detection results; and, in at least a portion of the time between a first and a second exposure during continuous photography, selectively driving said phototaking lens based on said stored focus detection results and based on focus detection results output after said first exposure.

16. The method of claim 15, further comprising the step of determining, before focus detection results are obtained after said first exposure, whether said phototaking lens will be driven based on said stored focus detection results.

17. The method of claim 16, further comprising the steps of:

determining whether an object is a moving object or a stationary object; and stopping driving of said phototaking lens when it is determined that said object is a stationary object.

18. The method of claim 16, further comprising the steps of:

calculating an image plane moving speed; and stopping driving of said phototaking lens when said image plane moving speed is greater than a predetermined value.

19. The method of claim 16, further comprising the steps of:

determining whether an object is moving closer to or away from said camera; and stopping driving of said phototaking lens when it is determined that said object is moving away from said camera.

20. The method of claim 16, wherein said detecting and outputting step comprises detecting and outputting as said focus detection results an image plane moving speed and a defocus amount.

* * * * *